US005482630A

United States Patent [19]
Lee et al.

[11] Patent Number: 5,482,630
[45] Date of Patent: Jan. 9, 1996

[54] CONTROLLED DENITRIFICATION PROCESS AND SYSTEM

[75] Inventors: Phillip G. Lee; Philip E. Turk; John L. Whitson, all of Galveston, Tex.

[73] Assignee: Board of Regents, The University of Texas System, Austin, Tex.

[21] Appl. No.: 263,656

[22] Filed: Jun. 20, 1994

[51] Int. Cl.$^6$ .................................................. C02F 3/30
[52] U.S. Cl. .................... 210/605; 210/614; 210/143; 210/150; 210/209; 210/903; 210/169; 119/260
[58] Field of Search .................................. 210/605, 614, 210/630, 903, 746, 103, 143, 150, 151, 169, 188, 202, 209, 603; 119/260

[56] References Cited

U.S. PATENT DOCUMENTS

| | | | |
|---|---|---|---|
| 3,661,262 | 5/1972 | Sanders | 210/169 |
| 3,709,364 | 1/1973 | Savage | 210/903 |
| 3,829,377 | 8/1974 | Hashimoto et al. | 210/903 |
| 3,953,327 | 4/1976 | Parker | 210/605 |
| 4,160,724 | 7/1979 | Laughton | 210/605 |
| 4,277,342 | 7/1981 | Hayes et al. | 210/614 |
| 4,370,233 | 1/1983 | Hayes et al. | 210/614 |
| 4,510,243 | 4/1985 | Haga et al. | 210/614 |
| 5,232,585 | 8/1993 | Kanow | 210/151 |
| 5,304,308 | 4/1994 | Tsumura et al. | 210/614 |

OTHER PUBLICATIONS

Adams, "Anatomy of an automation project", *Programmable Controls*, 8(4):39–41, 1989.

Balderston et al., "Nitrate removal in closed–system aquaculture by columnar denitrification", *Appl. Env. Microbiology*, 32(6):808–818, 1976.

Becking et al., "Limits of the natural environment in terms of pH and oxidation–reduction potentials," *J. of Geology*, 68(3):243–284, 1960.

Biswas et al., "Nitrogen transformations and fate of other parameters in columnar denitrification", *Water Research*, 19(8):1065–1071, 1985.

Bokranz et al., "Energy metabolism and biosynthesis of Vibrio succinogenes growing with nitrate or nitrite as terminal electron acceptor", *Arch. Microbiol.*, 135:36–41, 1983.

Bonin et al., "Denitrification by a marine bacterium, Pseudomonas nautica Strain 617", *Ann. Inst. Pasteur/Microbiol.*, 138:371–383, 1987.

Boyd, "Water quality in warmwater fish ponds", *Auburn Univ. Agric. Exp. Stn. Rep.*, 35–40, 1984.

Boyd et al., "Nitrogen fertilization of ponds", *Trans. Am. Fish. Soc.*, 107(5):737–741, 1978.

Brody, "Bioenergetics and growth, with special reference to the efficiency complex in domestic animals", Hafner Press, New York, 778–779, 1974.

Culp et al. (eds.), "Nitrogen removal", *Handbook of Advanced Wastewater Treatment* (2nd ed.), Van Nostrand Reinhold Co., New York, 298–323, 1987.

Dahab et al., "Nitrite removal from water supplies using biological denitrification", *Journal of the Water Pollution Control Federation*, 60(9):1670–1674, 1988.

Esteves et al., "Nitrate reduction activity in a continuous flow–through system in marine sediments", *Microb. Ecol.*, 12:238–290, 1986.

Evans et al., "Quantification of denitrication by strain T1 during anaerobic degradation of toleuene", *Appl. Microbiol. Biotechnol.*, 37:136–140, 1992.

Fannin et al., "Anaerobic processes", *Journal of the Water Pollution Control Federation*, 58(6):504–510, 1986.

(List continued on next page.)

Primary Examiner—Christopher Upton
Attorney, Agent, or Firm—Arnold, White & Durkee

[57] ABSTRACT

A process and system for the reduction of nitrate to nitrogen in a fluid medium. Anaerobic bacteria fed by a carbon source are used for nitrate reduction. The addition rate of the carbon source and process residence time are controlled using the oxidation-reduction potential of the fluid medium to achieve a desired level of nitrate reduction. An industrial process control system may be used to monitor inputs and control outputs. A column of suspended beads may be used as the anaerobic bacterial bed for denitrification.

30 Claims, 10 Drawing Sheets

OTHER PUBLICATIONS

Fannin et al., "Anaerobic processes", *Journal of the Water Pollution Control Federation*, 59(6):403–409, 1987.

Gary, "On-line electrochemical sensors in fermentation", *American Biotechnology Laboratory*, 7(2):26–33, 1989.

Hanlon et al., "Squid and cuttlefish mariculture: an updated perspective", *Journal of Cephalopod Biology*, 2(2):31–40, 1991.

Harper et al., "Enhancement of anaerobic treatment efficiency through process modification", *Journal WPCF*, 59:152–161, 1987.

Heales, "Water quality changes during the conditioning of small, closed seawater systems", *CSIRO Marine Laboratories*, Report 176, 1985.

Hughs et al., "A pilot-scale reuse system for salmonids", *Progressive Fish-Culturist*, 47(4):251–253, 1985.

Jeris et al., "Pilot-scale, high-rate biological denitrification", *Journal WPCF*, 47(8):2043–2057, 1975.

Jones, "Denitrification by anaerobic filters and ponds, phase II", *Water Pollution Control Research Series*, Report No. #13030 ELY 06/71–14, Environmental Protection Agency, 1971.

Krogulska et al., "Bacterial microflora participating in the removal of nitrogen from industrial wastewaters by nitrification and denitrification", *Acta Microbiologica Polonica*, 33(1):67–76, 1984.

Kruner et al., "Nitrogen removal by biological denitrification in a recirculated fish culture system", International Council of the Exploration of the Seas, Copenhagen, Denmark, F:21/CM, 1984.

Lamb et al., "Nitrogen removal for on-site sewage disposal: field evaluation of buried sand filter/greywater systems", *Transactions of the ASAE*, 34(3):883–889, 1991.

Lee, "Automation of aquaculture systems: a review and practical guide to implementation", *Engineering Aspects of Intensive Aquaculture*, 284–300, Northeast Regional Aquaculture Engineering Service, Ithaca, N.Y., 1991.

Lee et al., "Computer automation for recirculating aquaculture systems", Abstract, *Techniques for Modern Aquaculture*, American Society of Agricultural Engineers, St. Joseph, Mich., Jun. 21, 1993.

Lee et al., "Computer automated control of recirculating aquaculture systems", Abstract 246, *World Aquaculture Society Conference*, Orlando, Fla., 141, 1992.

Lee et al., "Computer automation and expert systems for the control of recirculating aquaculture filtration systems", Abstract, *Journal of the World Aquaculture Society*, 22(3):35A, 1991.

Lignell et al., "Nitrogen metabolism in *Gracilaria secundata* Harv.", *Hydrobiologia*, 151/152:431–441, 1987.

Mycielski et al., "Denitrification of high concentrations of nitrites and nitrates in synthetic medium with different sources of organic carbon. II. Ethanol", *Acta Microbiologica Polonica*, 32(4):381–88, 1983.

Narkis et al., "Denitrification at various carbon to nitrogen ratios", *Water Research*, 13:93–98, 1978.

Otte et al., "Management of a closed brackish water system for high-density fish culture by biological and chemical water treatment", *Aquaculture*, 18:169–181, 1979.

Payne, "Reduction of nitrogenous oxides by microorganisms", *Bacteriological Reviews*, 37(4):409–452, 1973.

Poston et al., "Interrelation of oxygen concentration, fish density, and performance of Atlantic salmon in an ozonated water reuse system", *The Progressive Fish-Culturist*, 50:69–76, 1988.

Przytocka-Jusiak et al., "Intensive culture of *Chlorella vulgaris*/AA as the second stage of biological purification of nitrogen industry wastewaters", *Water Research*, 18(1):1–7, 1984.

Ripley et al., "Improved alkalimetric monitoring for anaerobic digestion of high-strength wastes", *J. Water Pollution Control Federation*, 58(5):406–411, 1986.

Ross et al., "Engineering problems with the anaerobic digestion of solution organic wastes", *Anaerobic Digestion*, 89–106, 1981.

Spotte, *Seawater Aquariums, The Captive Environment*, John Wiley and Sons, New York, 139–144, 1979.

Turk et al., "Design and economic analyses of airlift versus electrical pump driven recirculating aquaculture systems", *Engineering Aspects of Intensive Aquaculture*, Northeast Regional Aquacultural Engineering Service, Ithaca, N.Y., 271–283, 1991.

Tytler et al. (eds.), *Fish Energetics, New Perspectives*, The Johns Hopkins University Press, Baltimore, Md., 156–157, 1985.

van Rijn et al., "Aerobic and anaerobic biofiltration as an aquaculture unit—nitrite accumulation as a result of nitrification and denitrification", *Aquacultural Engineering*, 9:217–234, 1990.

Whitson et al., "A prediction of feasibility of denitrification of closed recirculating marine systems", Abstract, *Journal of the World Aquaculture Society*, 22(3):65A, 1991.

Whitson et al., "Biological denitrification in a closed recirculating marine culture system", *Techniques for Modern Aquaculture*, 458–66, American Society of Agricultural Engineers, St. Joseph, Mich., Jun. 21, 1993.

Williams et al., "Smart data acquisition: coupling microcontrollers and sensors", *Scientific Computing & Automation*, 4(2):59–62, 1989.

Wilson, "An experimental search for phytoplanktonic algae producing external metabolites which condition natural sea waters", *Marine Biological Association of Great Britain*, 61:585–607, 1981.

Yang et al., "Design and function of closed seawater system for culturing Loliginid squids", *Aquacultural Engineering*, 8:47–65, 1989.

Ying et al., "Automation of a squid culture tank system", Abstract 124, *Proceeding of the 10th Annual Conference on Biomedical Engineering Research*, Houston, Tex., 1992.

Ying et al., "Modeling a squid culture tank system", *Proceeding of the 1992 International Simulation Technology Conference*, Houston, Tex., 412–415, 1992.

Yingst, "PC-based architecture guides process control", *InTech*, 35(9):117–120, 1988.

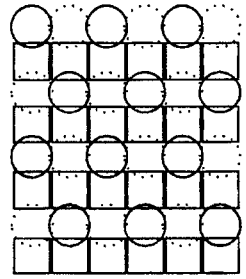
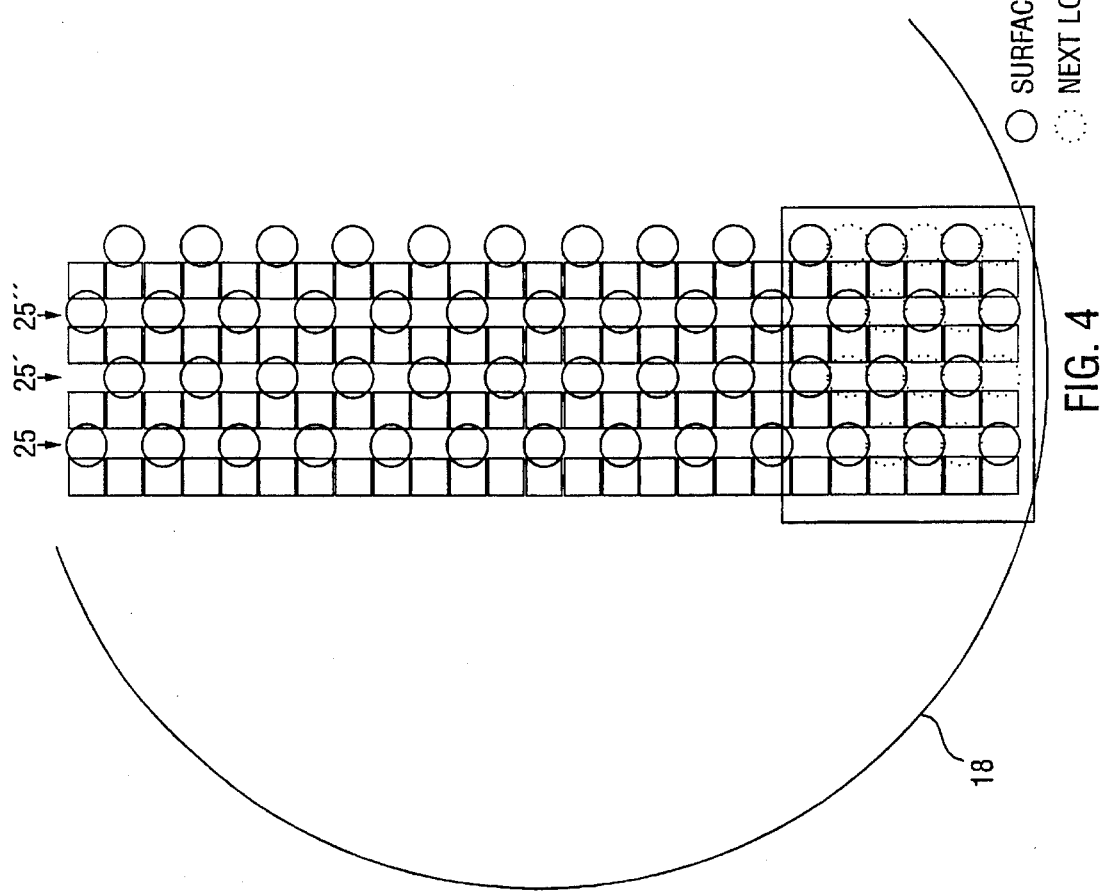

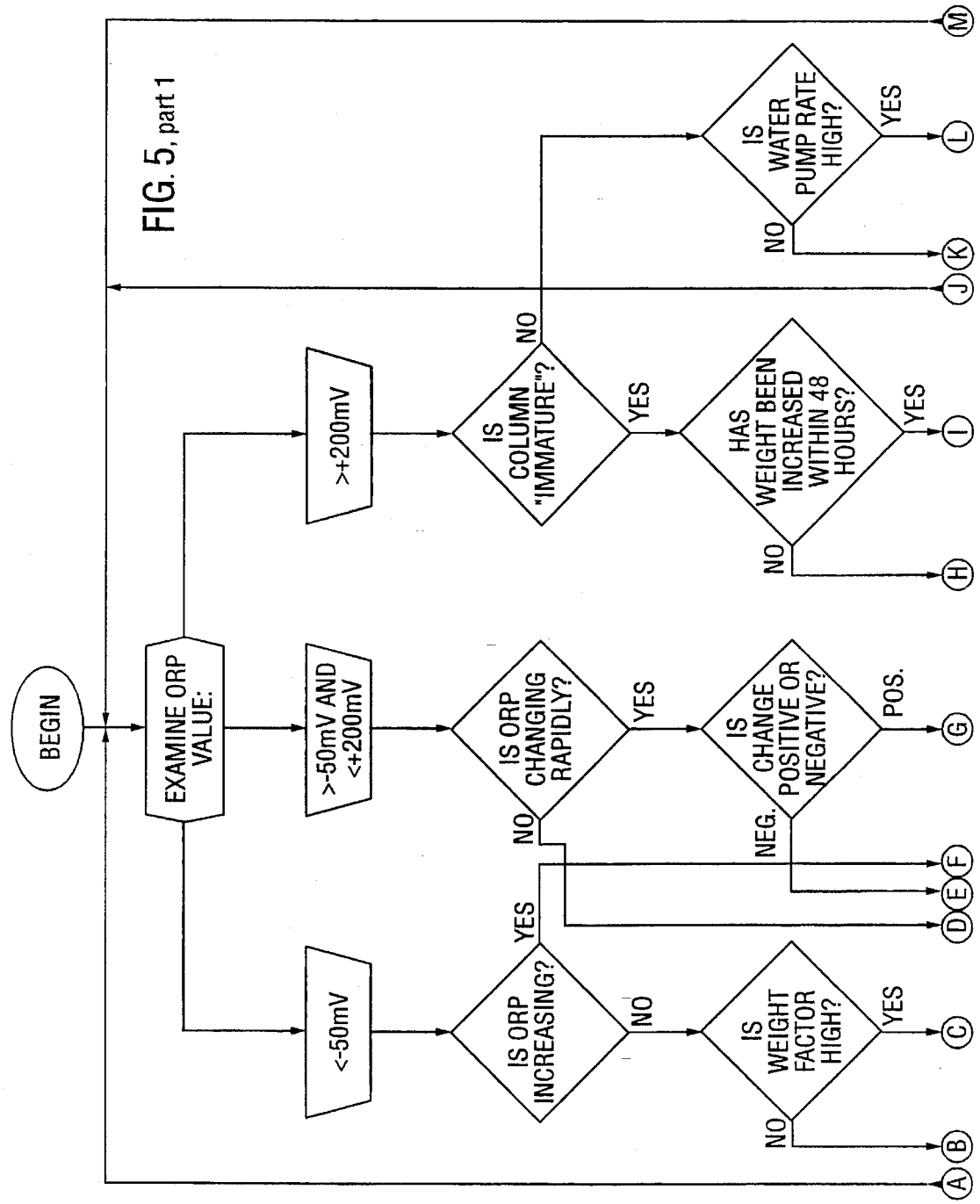
FIG. 5, part 1

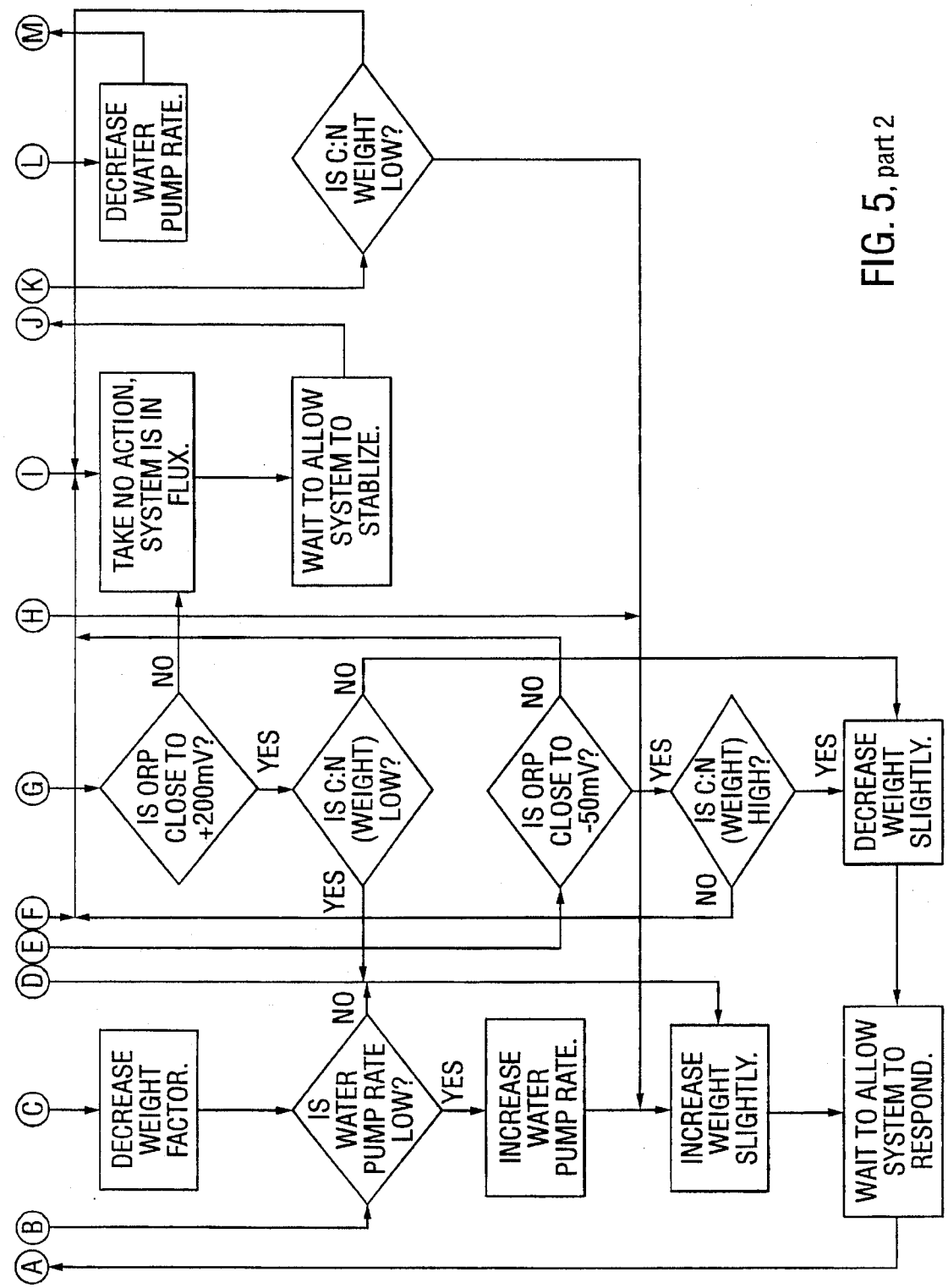
FIG. 5, part 2

CONTROLLED DENITRIFICATION PROCESS AND SYSTEM

BACKGROUND OF THE INVENTION

The government owns rights in the present invention pursuant to Grant No. R-ME-1 from the United States Department of Commerce Sea Grant College Program through the Texas A&M Sea Grant College Program.

1. Field of the Invention

This invention relates to controlled denitrification of fluids by anaerobic bacteria. More particularly, the invention relates to use of the oxidation-reduction (redox) potential ("ORP" or "eH") of the fluid medium to control the denitrification process. This invention has potential application to aquarium, aquaculture, and waste water treatment industries, and to any other closed or semi-closed system (e.g., space travel, closed biospheres, swimming pools, industrial effluents, etc.).

2. Description of Related Art

A bibliography with consecutively numbered references is included at the end of the specification. The superscripted numbers included throughout the specification refer to these references. The references listed in the bibliography, to the extent they provide exemplary procedural or other details supplementary to those set forth herein, are specifically incorporated herein by reference.

One of the end products of amino acid degradation is ammonia ($NH_3$).[8] As a result, protein catabolism results in a net production of ammonia, which aquatic organisms release directly into their environment.[22] In the open ocean, ammonia is normally taken up by photosynthetic organisms,[6,7] but in most aquaculture facilities, it is not practical to rely on these micro- and macroalgae to remove ammonia.[16,18,24] Without some mechanism to remove it, ammonia can easily build up to toxic levels.

In most indoor, closed aquaculture systems, ammonia is oxidized to nitrite ($NO_2^-$) in an aerobic biofilter by autotrophic bacteria.[12,23] Nitrite is more toxic than the ammonium ion ($NH_4^+$), so a second set of bacteria are normally used to oxidize the nitrite to nitrate ($NO_3^-$). While nitrate is considerably less toxic than ammonium or nitrite, it too can become a problem at high levels.

Nitrate is typically removed from recirculating culture systems by water exchange. Unfortunately, water exchange has several drawbacks. First, water removal in aquaculture systems normally involves a slow exchange, with thorough mixing of old and new water to avoid stressing cultured animals.[20] The thorough mixing may result in a net loss of effectiveness of the exchange, since the discharged waste is already diluted by the newly introduced water. Second, in systems where natural sea water is unavailable, deionized water and sea salts must be mixed, which may incur heavy costs. Finally, the high nitrate effluent must normally be discharged.

This last condition is potentially the most troublesome, since salt water can not typically be discharged into a sewage system, nor dumped into a river. Further, there is growing environmental concern about the discharge of nitrogenous wastes. Discharge permits may be complex and often require very stringent pollutant limits.[6] It may be more economically feasible and environmentally conscientious to remove the nitrate and reuse the sea water than to discharge nitrate-laden effluent.

The ability of a compound to be oxidized is normally represented as an electrical potential relative to a hydrogen electrode.[2] This is the ORP and is normally measured in millivolts (mV). In water, oxidizing compounds are reduced as terminal electron acceptors in the electron transport chain.[4,5] They are generally utilized by bacteria in descending order of electropositivity, i.e., $O_2$ first, then 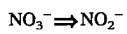, NO, $SO_4^{-2}$, etc.[1,2]

This situation may be exploited to remove nitrate from water. Facultative anaerobic bacteria in anaerobic conditions, with sufficient carbon, can be induced to reduce nitrate to nitrite:

$$NO_3^- \Rightarrow NO_2^- \qquad \text{Step 1}$$

With sufficient time and available carbon, nitrite can be further reduced to nitrogen gas via the chain:

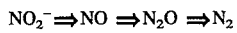 Step 2[10,11]

However, a system using bacteria to remove nitrate from water can be difficult to control and may require close monitoring to prevent release of toxic intermediate oxides of nitrogen, or worse, reduced sulfur as hydrogen sulfide ($H_2S$).[1,23]

Waste water treatment also typically uses bacterial denitrification for nitrogen removal.[3,9] Waste treatment, however, does not generally require such fine control as in the aquaculture context, since production of hydrogen sulfide and bacterial particulate is not normally a critical concern.

Some industrial treatment researchers have reported denitrification rates as high as 362 mg N/L·h in solutions with nitrate levels of 1000 mg/L.[17,19] Reported removal rates of these magnitudes were achieved in industrial water treatment by injection of acetate. It would seem that acetate is the food of choice, but bacteria populations fed with acetate may soon be dominated by *Pseudomonas aeruginosa*, a human pathogen.[17] Alcohols such as ethanol or methanol consistently support lower denitrification rates but select for a more acceptable bacteria population.[13]

Waste water treatment often utilizes dissolved and particulate organic matter already present in the water (grey water) as a food source.[3] Denitrification in the aquaculture context, however, generally requires addition of a food source (such as methanol) because of the extremely low dissolved organic carbon levels of the typical culture system.[25] To ensure complete removal of nitrate and nitrite, typical waste water residence times range from 1 day to as long as several weeks.[14,19] Residence times of this duration are generally unsuitable for use in aquaculture because they can result in production of toxic $H_2S$.

Denitrification is the conclusive step in the removal of nitrogen bearing compounds from water.[9] In aquaculture, this has often been viewed as an impractical step.[20] However, there has been some work toward developing denitrification as a viable means of nitrate removal.[1,23]

Large scale denitrification has typically been a poorly controlled process.[9] Several factors may affect production of undesirable toxic by-products. Lack of available reduced carbon, limited reaction time, low bacterial biomass or high inlet dissolved oxygen levels can lead to production of nitrite by single step reduction of nitrate, without nitrite reduction. Excessive reaction time or excess available carbon may result in reduction of sulfate ($SO_4^{-2}$) to hydrogen sulfide. Also, the close monitoring and fine control required by a biological denitrifier may be an impractical demand on human operators, who may succumb to fatigue or boredom.

It is a feature of this invention to provide a denitrification process and system which address at least some of the shortcomings experienced by prior art systems.

SUMMARY OF THE INVENTION

This invention provides a process and system for the reduction of nitrate to nitrogen in a fluid medium, such as water. In this process and system, an anaerobic or partially anaerobic fluid medium containing nitrate is exposed to anaerobic bacteria. A fluid-miscible carbon source, such as methanol, is added to the fluid medium such that the anaerobic bacteria reduces at least some of the nitrate to nitrogen. The ORP in the effluent of the fluid medium (downstream from the anaerobic bacteria) is measured. Using the measured ORP of the effluent, the addition rate of the carbon source and the process residence time are controlled to achieve a desired level of reduction of the nitrate to nitrogen.

The fluid medium may be made anaerobic or partially anaerobic in accordance with the invention by displacing oxygen in the fluid medium with a gas. Preferably, the gas is biologically neutral, such as nitrogen. In an exemplary embodiment, the displacement gas is injected into the fluid medium in a countercurrent direction. The injection rate of the displacement gas may be controlled depending on the oxygen content of the fluid medium. Preferably, the fluid medium entering the denitrification stage has an oxygen content of less than about 1.5 mg/L, more preferably less than about 1.2 mg/L.

The addition rate of the carbon source and the process residence time (and the addition rate of displacement gas, if employed) may be controlled automatically. In an exemplary embodiment, these parameters are controlled using fuzzy logic. Preferably, the carbon source is added to the fluid medium such that the atomic ratio of carbon from the carbon source to nitrogen in the nitrate (C:N) is from about 1:1 to about 6:1, more preferably from about 1:1 to about 3:1.

The process and system provided by this invention are capable of reducing nitrate to nitrogen to levels below 10 mg/L in some applications.

A particularly important embodiment of this invention relates to denitrification of water used to support aquatic life, such as water used in aquariums or aquaculture. In these contexts, where the water typically contains sulfate, the carbon is added to the aqueous stream such that the anaerobic bacteria reduces at least some of the nitrate to nitrogen but does not substantially reduce the sulfate to hydrogen sulfide. In an exemplary embodiment, the denitrification effluent is aerated such that it is capable of supporting aquatic life.

The control means for the process and system may be automated with means for acquiring and concentrating data and a central processor, such as a computer. The means for acquiring data may include electrical sensors and mechanical sensors.

In an exemplary embodiment, the bacterial bed comprises a plurality of beads and means for suspending the beads. The term "suspending" in this context means physically supporting the beads in a manner that there is more void volume between the beads than there would be if the beads were allowed to rest on top of one another unsupported. Preferably, the beads are suspended such that at least some of the beads do not touch any other bead. In an exemplary embodiment, the void volume (i.e., the volume outside the beads) within the bacterial bed exceeds the bead volume. Preferably, the suspending means comprise a plurality of egg crate louvers, and the beads are made of glass. The bacterial bed may be disposed within a column.

BRIEF DESCRIPTION OF THE DRAWINGS

FIG. 4 is a top view of the bacterial bed shown in FIGS. 2 and 3.

FIG. 4A is an enlarged section of FIG. 4.

FIG. 5 is a flowchart of parameters and commands to control the denitrification process according to the invention.

FIGS. 6 and 7 are from batch mode reactions, and FIGS. 8–10 are from continuous on-line use of the system.

DETAILED DESCRIPTION

Figure 1:
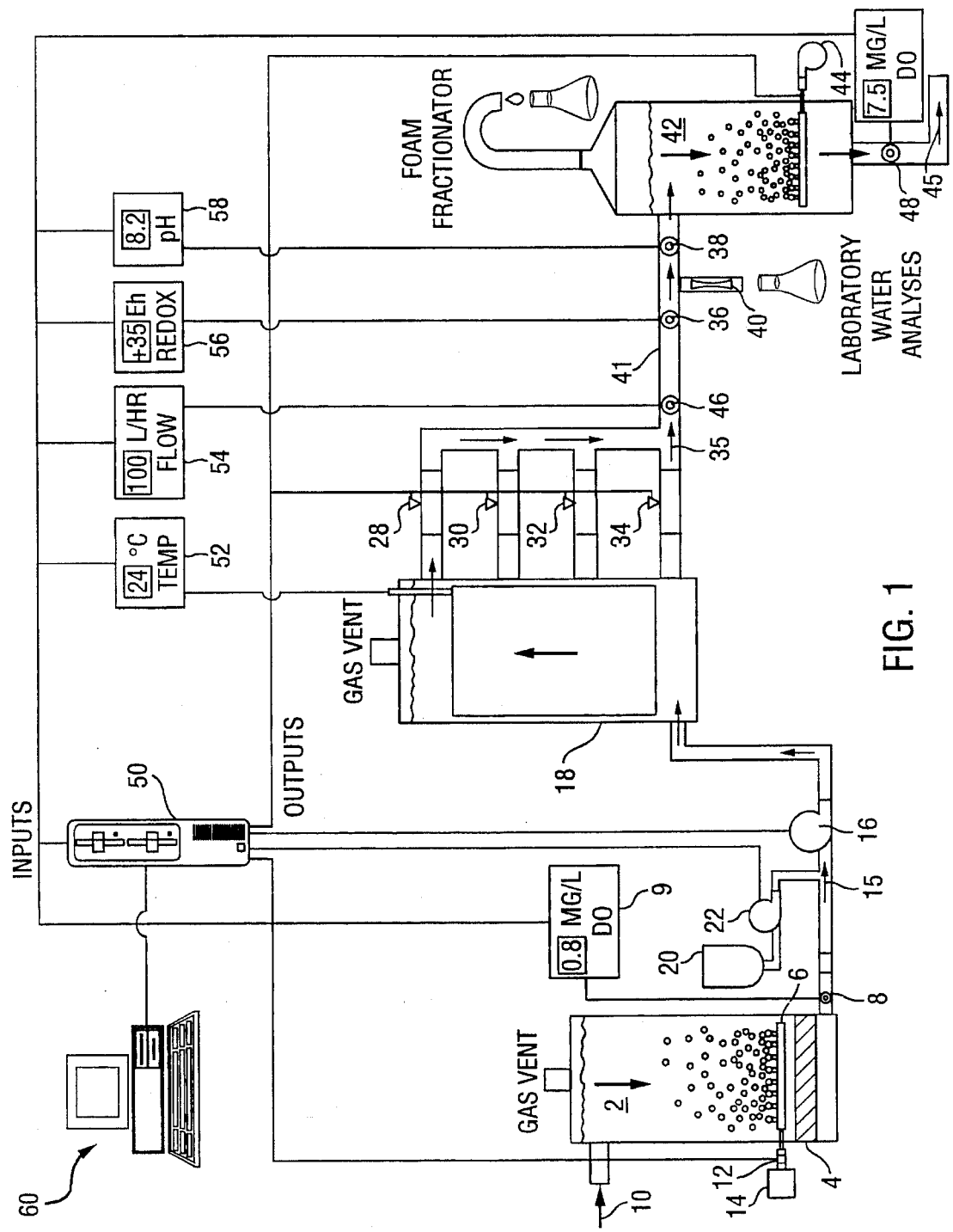
FIG. 1 is a schematic of an automated denitrifying bioreactor system embodying the present invention.

FIG. 1 illustrates an exemplary embodiment of a denitrifying bioreactor system according to the present invention. The illustrated embodiment employs a three stage process: (1) a deoxygenation/sparge column; (2) a denitrification column; and (3) a discharge column. This system can be used to reduce nitrate level in sea water to below about 10 mg/L in a continuously online, flow-through mode or a fixed-time batch mode without harm to aquatic life, including cultured animals (such as cephalopods, fish, and crustaceans).

Deoxygenation/Sparge

Referring to FIG. 1, the first stage strips oxygen from a water column using a bacterial filter bed 4 and controllable nitrogen gas diffuser 6 followed by a dissolved oxygen (DO) sensor 8, a DO meter 9, and a data acquisition system 50. Influent water 10 enters the deoxygenation/sparge (D/S) column 2 at the top and exits at the center of the bottom. Oxygen levels in the effluent water 15 need not be zero (i.e., anaerobic) and may be as high as 1.5 mg $O_2$/L (i.e., partially anaerobic).[1] If oxygen in the influent water 10 is above 1.0 mg $O_2$/L, a microcomputer controller 60 opens a gas valve 12 above the nitrifying bed 4 in the column 2, releasing nitrogen 14 through a diffuser 6 to sparge the tank 2 of oxygen. Some denitrification may begin in the D/S column 2, using endogenous dissolved organic carbon (DOC) as the energy source.[1]

Denitrification Column

In the second stage, effluent 15 (which is now anaerobic or partially anaerobic) from the D/S column 2 is pumped by a controllable metering pump 16 to the denitrification column 18. Methanol 20 is added to the denitrification column influent 15 by a peristaltic pump 22 at a preferred rate of 2.47 ml methanol per mg $NO_3$–$N^{-1}$ (C:N=0.93).[17] Reduction of $NO_3$–N to $N_2$ is progressive following the sequence $NO_3^- \rightarrow NO_2^- \rightarrow NO \rightarrow N_2O \rightarrow N_2$ with methanol as the energy source.[5] Methanol is a preferred energy source in this bioreactor since it is easy to obtain, comparatively inexpensive, mixes easily with sea water, and fosters microbial growth that releases $N_2$ from nitrate or nitrite. However, any suitable fluid-miscible carbon source may be used in place of methanol, such as other alcohols (e.g., ethanol) acetate, starches, or sugars. The desired endpoint is substantially nitrogen-free water containing levels of DOC and $H_2S$ as close to zero as possible.

The shell of the denitrification column 18 is a ⅛" sidewall fiberglass tube, 14" diameter and approximately 4–6' long, reinforced with fiberglass thread. (The D/S column 2 and discharge column 42 are similarly constructed). Such tubes are commercially available from Solar Components, Inc., Manchester, N.H.

Figure 3:
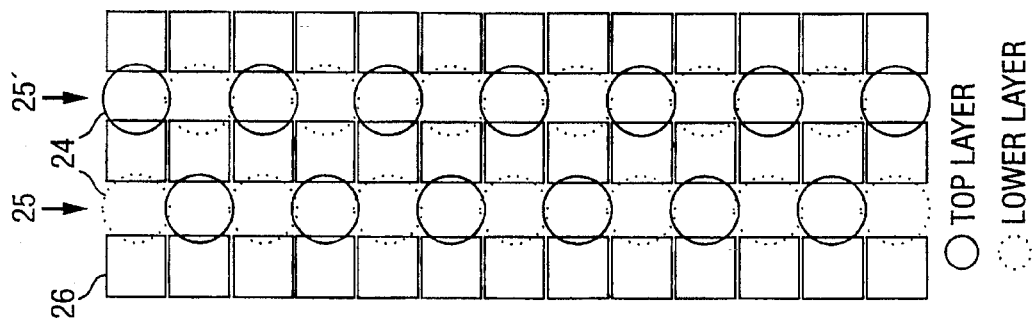
FIG. 3 is a side view of the bacterial bed shown in FIG. 2.
Figure 2:
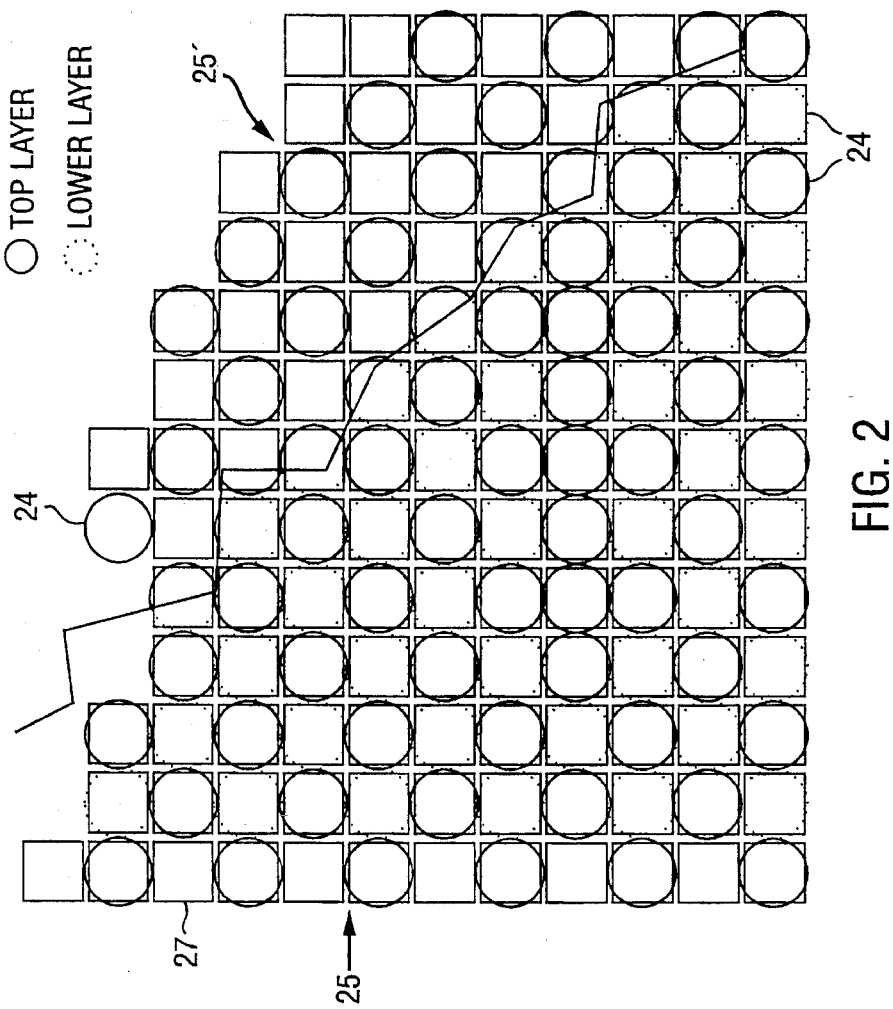
FIG. 2 is a front view of an exemplary bacterial bed provided by this invention.

The denitrification column 18 preferably contains the bacterial bed illustrated in FIGS. 2—4. This bacterial bed comprises glass beads 24 sandwiched between plates of polystyrene or polycarbonate louver panels 26 fitted within the column. Commercially-available beads and egg crate louvers may be used, such as glass beads from Jabo, Inc., Parkersburg, W.Va. and louvers from Cadillac Plastic, Houston and Dallas, Tex.

In a preferred embodiment, fifteen layers of beads 24 are sandwiched between sixteen sheets of louver panels 26. The beads 24 are 9/16" diameter, and the louver panels 26 are ½" thick, approximately 4–6' long (i.e., the length of column 18), and have ½"×½" square openings 27. The width of the louver panels 26 vary depending upon their position within column 18. Each layer 25 of beads 24 is arranged between two louvers 26 in a pattern placing a bead 24 in every other square 27, as shown in FIG. 2. The next layer 25' of beads 24 has a similar pattern, except that each bead 24 is shifted over one square 27 relative to the adjacent bead layers 25 and 25'', so that the beads 24 are offset going from one layer to the next. The louvers/bead suspension may be placed longitudinally within column 18. If desired, the suspension may be wrapped about its circumference by a thin sheet (⅛"–¼") of foam rubber prior to placing it into the column to ensure a tight fit and to minimize vibration of the suspension within the column.

It has been reported that spherical (1" diameter) media give the most favorable surface area to void volume ratio for denitrification, are slower to plug than other media and can be effectively cleaned by high pressure air and flushing.[32] The arrangement illustrated in FIGS. 2–4 maximizes the number of beads in the suspension without allowing the beads to touch one another. This provides a large substrate surface area for bacterial growth. At the same time, the void volume between the beads allows adequate flow up the column (between the beads and through the louvers), thus minimizing clogging by biomass (mucopolysaccharide) build-up, and facilitating cleaning the bacterial bed by flushing the column.

Referring again to FIG. 1, the influent water 15 enters at the bottom of the denitrification column 18 and is drawn off at the top from one of four water outlets 28, 30, 32, or 34 that are opened and closed by electrically actuated ball valves. Denitrifying columns typically develop flow-reducing bacterial assemblages to a much more serious degree than typical nitrifying filters. Serious clogging and channelization of the reactor bed are characterized by ammonia ($NH_4$–N) production and incomplete nitrite ($NO_2$–N) reduction. When this happens the reactor 18 should be cleaned and restarted.

Finally, a redox sensor 36 and pH electrode 38 sample the denitrification column effluent 35. The ORP value determines the flow rate and the amount of methanol added. A tap 40 is located in the effluent line 41 as well to supply water samples for water analysis to determine effluent $NO_2^-$, $NO_3^-$, $NH_4^+$, DOC and biological oxygen demand Any suitable anaerobic bacteria may be used in the denitrification column 18, such as bacteria of the genera *Aeromonas Psuedomonas, Bacillis*. In most aquatic systems, bacteria capable of anaerobic denitrification are typically present in low numbers. Provision of a suitable environment will usually result in development of a denitrifying population after a very short period of time.

When nitrate nitrogen is exhausted and DOC is greater than zero, sulfur becomes an electron donor forming hydrogen sulfide. ORP changes from positive to negative ORP values as this transition takes place.[1]

The denitrification column performance exploits the bacteria's preferential selection of the highest energetic yield metabolic pathways. In the absence of a preferred terminal electron acceptor for the electron transport chain, certain bacteria synthesize enzymes which use the next best available terminal electron acceptor. By removing oxygen from the water and providing a food source for metabolism (methanol), these bacteria are induced to develop metabolic pathways which utilize first nitrate, then nitrite, as terminal electron acceptors. Nitrate reduction produces nitrite. Nitrite reduction releases nitrogen gas into solution, from which it bubbles out into the atmosphere. This results in the removal of first nitrate, then nitrite from the water.

The main control parameters for the bioreactor operation are methanol injection rate ("MeOH") and water flow (pump) rate ("Flow"). MeOH determines the atomic ratio of carbon (from methanol) to nitrogen (from nitrate) in the fluid medium. Flow determines residence time ("ResTime") in the denitrification column 18, which may strongly influence the extent of reaction. Flow is preferably maintained so that ResTime is between 1.75 and 2.25 hours.

The main response factor is the ORP of the denitrification column effluent 35. Based on published data, it is possible to estimate the principal species being reduced from the ORP value. Values of ORP above +200 mV indicate that the principal terminal electron acceptor is $O_2$. Values between –50 mV and +200 mV indicate that $NO_3^-$ and $NO_2^-$ ions are the principal terminal electron acceptors. ORP values below –100 mV indicate reduction of $SO_4^{-2}$ to $H_2S$.

The relationship between ORP and MeOH is qualitatively inverse. That is, in general, with sufficient ResTime, an increase in MeOH results in a decrease in effluent ORP.

The relationship between ORP and ResTime is also qualitatively inverse. That is, in general, with sufficient MeOH, an increase in ResTime results in a decrease in effluent ORP.

Normal operation in this exemplary embodiment seeks to maintain effluent ORP between –50 mV and +200 mV. Best performance has been achieved by maintaining ORP between 0 mV and +150 mV, "best performance" being defined as maintaining a steady removal of $NO_3^-$ from water containing low levels of $NO_3^-$ without significant production of toxic byproducts.

Published research has indicated that the optimum carbon to nitrogen ratio (C:N) for denitrification is 1:1. However, experience with this invention has shown that at very low nitrate levels, the most efficient removal may actually occur at a much higher C:N ratio. Thus, MeOH required is calculated from the measured current raceway $NO_3^-$ concentration to achieve a 1:1 C:N ratio. The resulting value may be multiplied by a weight factor ("Weight") to moderate denitrification within the column 18 as indicated by effluent ORP. The preferred Weight typically ranges from 1 to about 3, but may be increased to any level desired (e.g, 6). For example, if the weight factor selected is 2, MeOH will be adjusted such that the atomic ratio of carbon (from methanol) to nitrogen (from nitrate) is 2:1.

As shown in FIG. 5, the preferred control paradigm is most clearly described as a set of fuzzy logic rules of operation. Shading in FIG. 5 indicates fuzzy logic steps. The preferred rules of operation are:

1) If ORP is between 0 mV and +150 mV, and ORP is not changing greatly, make no changes to operation. A working definition of "changing greatly" may be defined as more than 25 mV/hour change (positive or negative). (The working definitions provided in these rules are for illustrative purposes only, and may be modified as needed for other systems designed in accordance with this invention). N.B. The actual fuzzy membership function is then defined as 0.0 at 0 mV/hour and 1.0 at 25 mV/hour and above.

2) If ORP is between 0 mV and +150 mV, and ORP is rapidly increasing, increase ResTime slightly, and increase Weight. As before, one working definition of "rapidly increasing" is the same as the fuzzy membership function for "changing greatly" (above), in the positive direction only. One working definition of "increase ResTime slightly" is an increase of between 0 and 10 minutes, depending on the ORP membership in "rapidly increasing." "Increase Weight" may be defined as somewhere between 0.0 and 1.0, again based on the ORP membership in "rapidly increasing."

3) If ORP is between 0 mV and +150 mV, and ORP is rapidly decreasing, decrease ResTime slightly, and decrease Weight. A working definition of "rapidly decreasing" is the same as the definition for "changing greatly" (above) in the negative direction only. Similarly, "decrease ResTime slightly" and "decrease Weight" are similar to "increase ResTime slightly" and "increase Weight" from above, respectively.

4) If ORP is above +150 mV, and ORP is decreasing, make no changes to operation.

5) If ORP is above +150 mV, and ORP is not changing greatly, increase ResTime and increase Weight slightly.

6) If ORP is above +150 mV and ORP is increasing greatly, increase ResTime and increase Weight.

7) If ORP is below 0 mV and ORP is not changing greatly, decrease ResTime slightly and decrease Weight slightly.

8) If ORP is below 0 mV and ORP is decreasing greatly, decrease ResTime and decrease Weight greatly.

9) If ORP is below 0 mV and ORP is increasing greatly, make no changes to operation.

Preferably, the nitrate level achieved in the effluent of the denitrification column is below about 10 mg/L.

There may be a significant lag between changes in control parameters and responses from ORP. In the first days of operation, there may be no response at all to changes in control parameters. Until sufficient bacterial biomass has built up in the column chamber 18, there may be no significant denitrification. Experience has shown that there may be a 1–2 week lag between startup and the first significant denitrification.

In addition, there may be a 24–72 hour period required for a new balance to be achieved by the denitrification column 18 after significant changes in control parameters. Once again, this may be due to changes in bacterial biomass in the reactor column 18. Control changes during this period may produce unpredictable responses.

Discharge Column

Finally in the third stage, the water stream 35 passes through a discharge column 42 (14" diameter fiberglass tube) that is vigorously aerated with air, oxygen, or ozone via an air compressor, oxygen injection system, or ozonator 44. The ozone may be necessary if high dissolved organic or high nitrite concentrations are present at this stage. The final effluent 45 is discharged through activated carbon into the biological filter bed so that trace nitrites are removed. This means that some recycling between nitrate and nitrite may occur and this may be used to measure the efficiency of the bioreactor. However, it is desired that no toxic nitrites be injected into the culture tank and that there be net removal of nitrate.

EXAMPLES

Experimental Apparatus

An automated denitrifying bioreactor was designed, constructed, and tested for a recirculating aquaculture system in the 5,000–50,000 L range in accordance with the system illustrated in FIG. 1. The bioreactor was sized so that nitrate levels were maintained below 10 mg/L in the bioreactor effluent, and the flow rate through the system was from 50 L/hr to 600 L/hr.[1]

The experimental apparatus included a dual-column, upflow biological reactor with a combined volume of 125 L attached to a 15,000 L raceway system. Water was taken from the outflow of an aerobic filter bed, passed through a countercurrent nitrogen sparge column (14" diameter tube of opaque fiberglass), then pumped into the base of the two columns. The water was drained from the top of the columns by gravity and reaerated before being returned to the filter bed.

The columns were filled with large substrate (9/16" diameter beads), to provide extremely large pores. Large pores were used to reduce blockage and channelization by accumulated bacterial biomass.[1] The volume of one column (with substrate) was determined by filling the column with water passed through a volumetric meter (Kent Corporation, Kent, England). The column was filled 3 times and the arithmetic mean was determined to be 62.4 (±2.4) L.

Electrically actuated polyvinylchloride (PVC) ball valves (Asahi/America Electromni) were used to control gas and direct water flows into and out of the columns. A 0–90 VDC variable speed electric pump (March Manuf. Inc., mod. 809 HS) and controller (Dart Controls, Inc. mod. 251D) were used as the main water pump for the system. Water flow rate was monitored by a flow-meter (Metron Technology MV10) and repeater (Great Lakes Instruments mod. 697 F). Methanol (reduced carbon source) was injected via variable-speed peristaltic pump (Cole-Palmer Co. mod. 7520-35). Column inlet $O_2$ levels were monitored with a polarographic oxygen probe and meter (Yellow springs Instrument Co. mod. 58). Effluent pH and eH levels were monitored with industrial pH and ORP sensors (Omega Instruments mod. PHE-5460 and ORE-5460, respectively) and repeaters (Omega Instruments mod. PHTX-91 and Great Lakes Instruments Co. mod. 697 R2 respectively). Where possible all repeaters used 4–20 milliamp (mA) current levels to input information to the multiplexer, and where possible, all controllers responded to 4–20 mA output signals.

Microcomputer Control System

A supervisory control and data acquisition system (SCADA) 50 was installed on the bioreactor. The design of the electronics conformed to the National Institute of Science and Technology Model of Automation.[26] Sensors 8, 36, 38, 46, 48 and others (not shown)[15,30,34] monitored dissolved oxygen (YSI and Omega Engineering, Inc.), pH, conductivity/salinity (Omega), oxidation/reduction potential (Omega), and temperature (Omega). The sensors connected to indicating meters or non-indicating transmitters 52, 54, 56, and 58 that produced a digital or proportional analog output signal (4–20 mA, 0–1 V, etc.). Output devices, including electrically actuated on/off ball valves (Asahi/America) and variable speed pumps (March Manufacturing, Inc. and Cole Palmer Instrument Co.), accepted digital or analog input signals (4–20 mA, 0–1 V, etc.).

The inputs and outputs interfaced through a 16 channel industrial input/output (I/O) multiplexer (OPTO-22-based IO Plexer, Dutec, Inc.). Information gathered through the multiplexer was transmitted in a RS-232 standard serial connection to a microcomputer host, 80486-50 MHz with math coprocessor, 8 Mb RAM, mouse, 340 Mb hard disk and xVGA graphics.[39,40] The SCADA host loaded set-points for alarm and control functions, used algorithms to relate multiple inputs, controlled multiple outputs and provided graphics for trending and modeling. A commercially available industrial process control software package (Intellutions Inc. FIX DMACS for DOS Windows version) integrated the I/O and control system; it was modular and cost-effective. The software was configured to accept input and display current system status to an operator.[15] Main pump water speed was maintained at an operator-selected rate by this software package using a proportional integral/derivative (PID) software controller which monitored the flow-meter. The microcomputer was connected to a microcomputer local area network (ethernet LAN) that was composed of 20 personal computers (IBM-compatibles, Macintoshes and Digital Equipment MicroVax). Thus, data on bioreactor function and alarm conditions could be accessed readily from the LAN.

The control software included a specific driver/interface to the I/O multiplexer, eliminating the need to program any custom subroutines for communication between devices. Once communication was established between the I/O devices and the control software, the calibration of the sensors began. This was simple where the I/O device was digital (on/off) but it was more complicated for analog I/O devices. The latter required that the zero off-set (establish a 0 reading) and the signal range be set.

Figure 9:
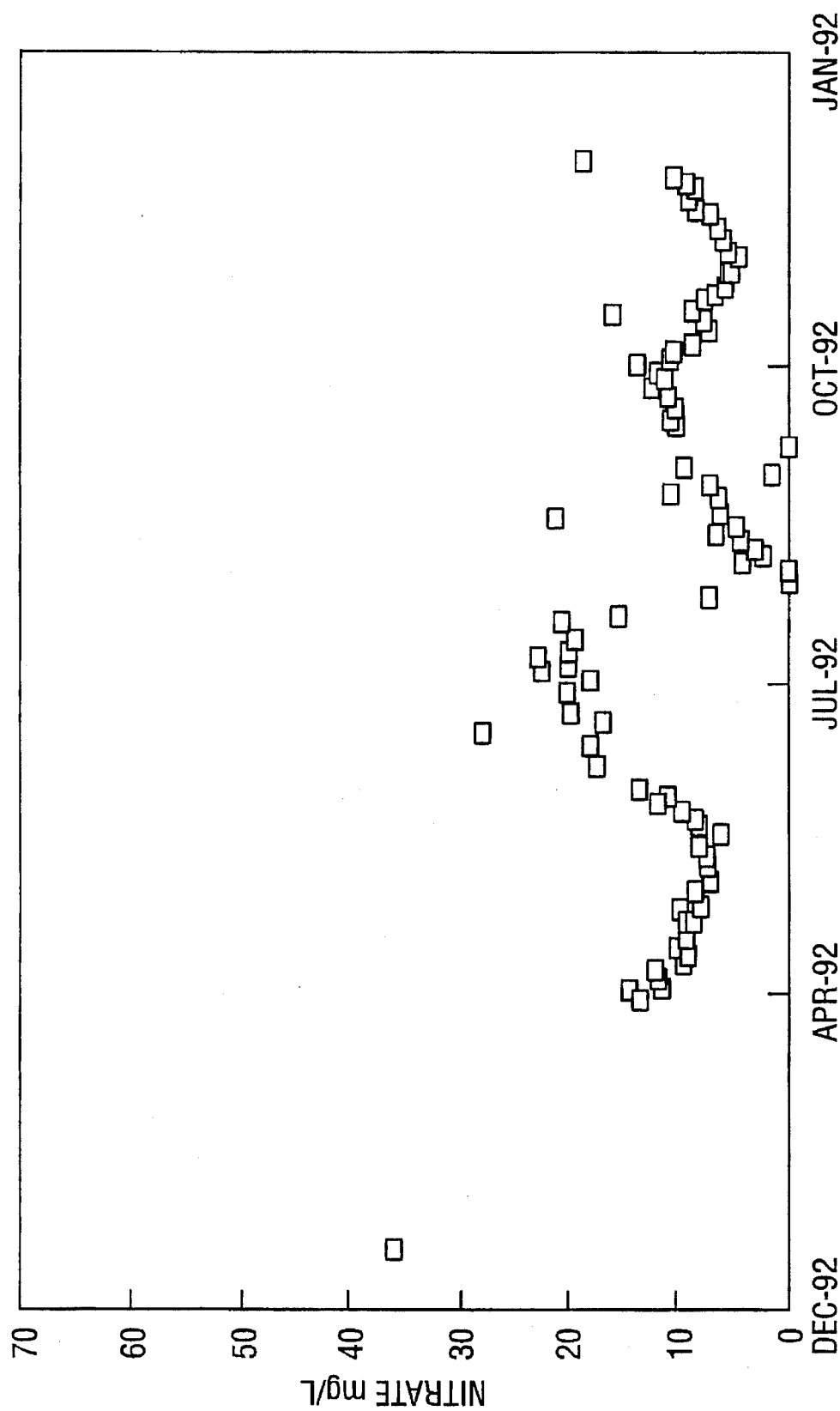

The next step in configuring the SCADA host computer's software involved building the needed databases and the display screens (graphic modeling tools were included in the software). The bioreactor was represented by a side-view schematic with sensor locations and the pumps and valves indicated. The values of all the measured parameters were displayed in boxes on the bioreactor screen. The valve states, water levels and nitrogen sparge were all animated so that their function could be quickly inspected. All data from inputs and outputs were stored directly to disk for later retrieval. A historical trending screen was also designed in which the values for ORP, pH, flow, dissolves oxygen and nitrogen sparge valve state were summarized (FIG. 9).

Ammonia, nitrate and nitrite levels in both raceway and column effluent were determined spectrophotometrically (Hach mod. DR/2000) on a bi-weekly basis. Nitrate values were entered into the database on the bioreactor status screen.

Safety Considerations

Because of proximity to and intimate association with sea water, all electrical and electronic components were isolated from the environment. Repeaters, power supplies, and multiplexer were mounted in acrylic (where visibility was a consideration) or PVC housings that were kept cool, dry and clean by maintaining a flow of filtered air through them from the aquaculture blower system. The multiplexer was optically isolated from all machinery and repeaters directly associated with water.

The system was designed to fail-safe. When power failed, all portions of the system ceased operation, preventing potential injection of methanol or toxic nitrogen and sulfur compounds into the raceway. The column inlet was fitted with a one-way check valve to prevent back-flow and water spills.

Effluent was passed directly to an aerobic biological filter bed to oxidize any nitrite or hydrogen sulfide inadvertently produced by inefficient column operation and to consume any undigested organic matter between its introduction to the raceway.[20]

Monitoring and Data Collection

The control software was configured to poll the multiplexer every 5 seconds for status information. The acquired data was averaged over 30 second periods and stored in a database on the microcomputer's hard disk. The information was output and analyzed using Lotus 1-2-3 (Lotus Development Corp., 1986) and PC-SAS (SAS Institute, 1991).

The bioreactor was operated in both batch and continuous on-line modes. For the batch mode, 1500 liters of high nitrate water (60 ppm) was denitrified to less than 10 ppm. For the on-line mode, a 15,000 L raceway was used. The control treatment ran for 153 days, reaching a maximum biomass load of 0.77 kg/m$^3$. The experimental treatment ran in the same raceway for 300 days and achieved a maximum biomass load of 1.04 kg/m$^3$.

Water exchange in both treatments was limited to replacement of water lost to spills and waste removal (0.15%/day control; 0.1%/day experimental). Water losses were recorded by technicians on data sheets and later input for analysis. Deionized water and added occasionally to replace evaporation losses.

System Control

Flow rate through the column was modified based on the signal received from the flowmeter. The PID flow rate control loop maintained a constant flow rate at the indicated setpoint. The only variations from the setpoint occurred when the pump motor's brushes began to deteriorate from wear, which provided a clear indication of pump status.

Water entering the bioreactor was initially passed downward through the nitrogen sparge column. When dissolved oxygen (DO) levels at the bottom of the column rose above 1.5 mg/L, compressed nitrogen was released into the column, providing a countercurrent sparge. Nitrogen gas, being more soluble in water than molecular oxygen, removed the oxygen by displacement. Sparging continued until the DO level at the bottom of the sparge column dropped below 0.7 mg/L.

The bioreactor was designed to respond to changes in effluent pH and eH by varying the flow rate through the column and changing the amount of methanol injected. Methanol injection rates were initially calculated from raceway $NO_3^-$ levels and modified to provide a 1:1 carbon:nitrogen atom ratio as suggested in published literature.[1] In addition, the bioreactor was incubated with extremely low flow rates (20 L/hr) for 14 days to allow bacteria populations to develop on the column substrate. When the effluent eH began to drop (indicating significant nitrate to nitrite reduction within the last segments of the column), the water flow rates were gradually increased at a rate sufficiently slow to maintain the reduced eH readings.

Results

Figure 6:
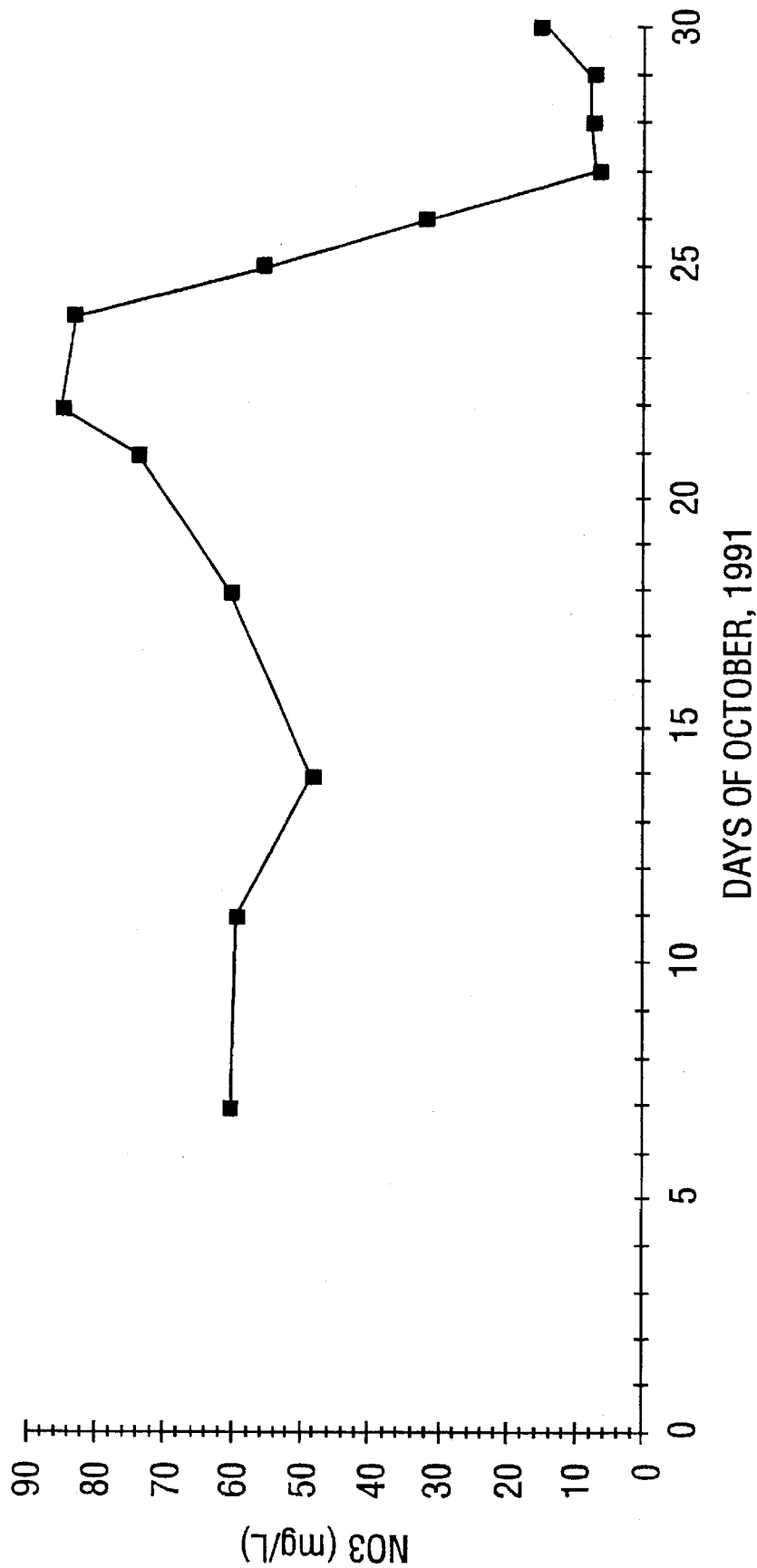
FIGS. 6–10 are graphs of experimental results showing measured nitrate levels over time using the denitrification system of this invention.
Figure 7:
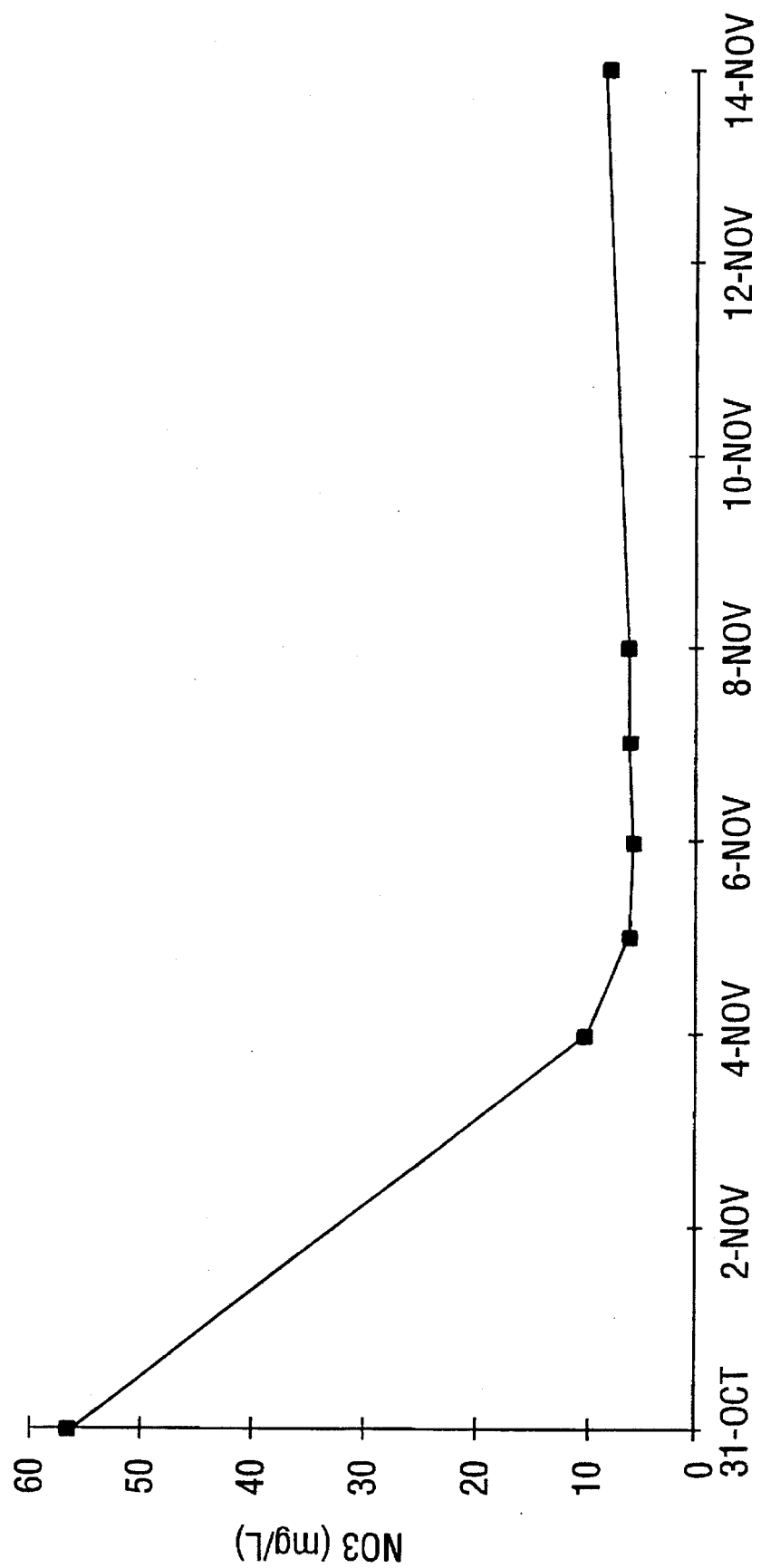

The first batch reaction required approximately three weeks of acclimation before denitrification began (FIG. 6). Once denitrification began, the 80 mg/L nitrate water was denitrified to less than 10 mg/L in approximately 72 hrs. The second batch reaction with an acclimated system required only 48 hours for denitrification of approximately 60 mg/L nitrate water (FIG. 7).

Figure 8:
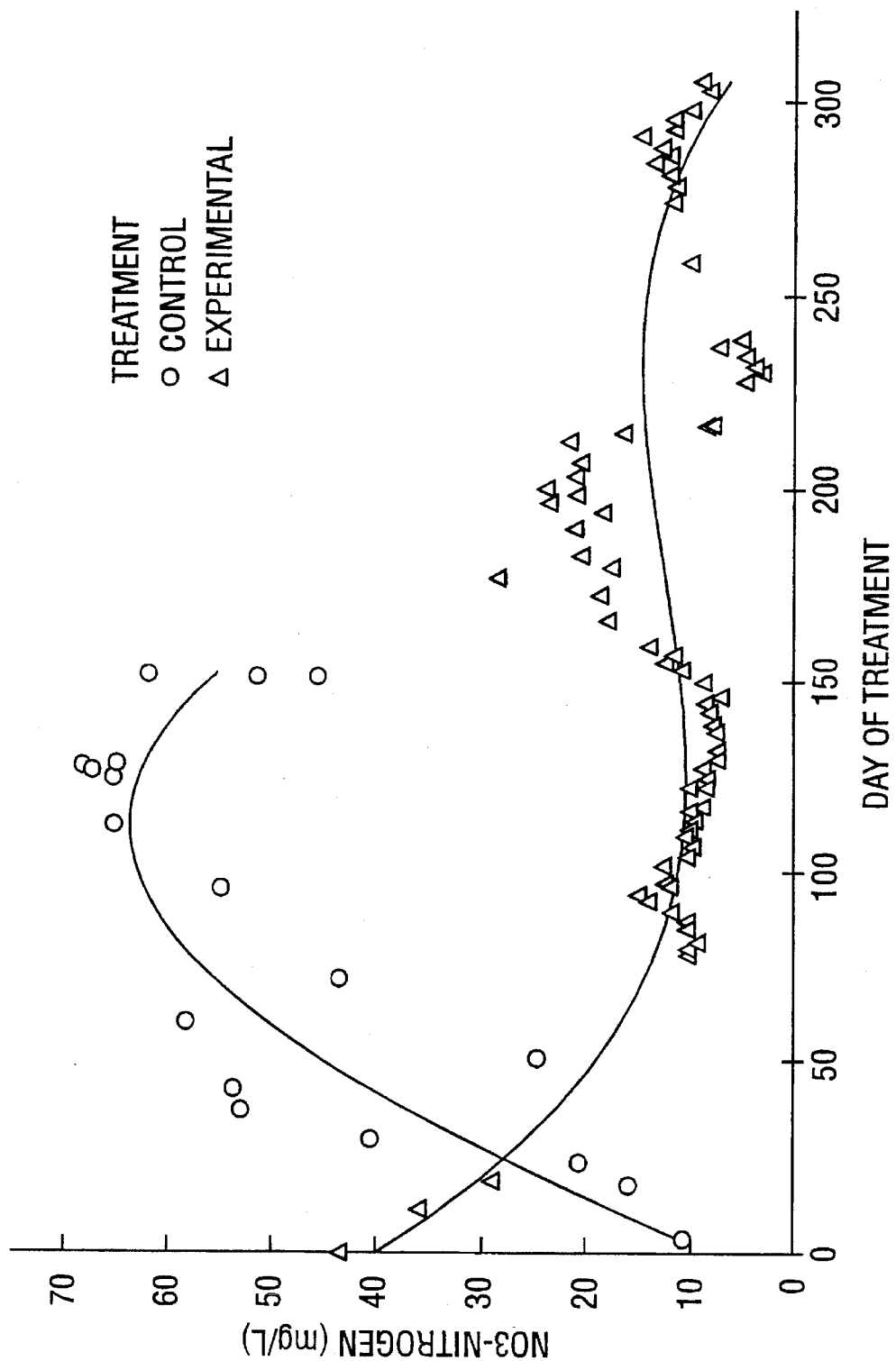

A comparison of nitrate levels in the continuous on-line mode is shown in FIG. 8. The curves show $NO_3^-$ concentrations in the 15,000 L raceway over two periods. In the first period (control), nitrate levels began slightly above 10 mg/L, and increased steadily from stocking with juvenile squid to a maximum of 68 ppm by day 150. There was a sharp increase in $NO_3^-$ production near day 110 in the control treatment which is a typical result of rapidly increasing biomass and activity associated with sexually maturing squid and reproducing squid. On days 60, 146, and 150, there were extensive water changes to reduce nitrate levels in the raceway. The last water exchange occurred on day 150 which lowered nitrate levels to between 45 and 55 mg/L. The graph displays an obvious 'rebound' in nitrate levels by day 155 back to above 55 mg/L.

On day 156, the anaerobic denitrification system was attached to the raceway system. The second curve (experimental) begins at day 0, which is 156 days after day 0 of the control run. The experimental treatment began with an initial $NO_3^-$ concentration of 43 mg/L, which quickly dropped to below 30 mg/L during the same amount of time that the control run had shown a steady increase in $NO_3^-$ levels. Nitrate concentration in the experimental treatment continued to quickly decrease to around 10 mg/L. Because of delays in sexual maturation, the sharp rise in $NO_3^-$ normally anticipated did not occur until after day 150. At around day 150 of the experimental run, there was an increase in metabolic activity of the cultured squids (the biologically active nitrogen source) due to sexual maturation. Between days 150 and 210, the nitrate levels rose to just above 20 mg/L. At their highest, $NO_3^-$ levels during this period were never observed to climb higher than 30 mg/L. After the bacterial biomass and control system achieved a new equilibrium, $NO_3^-$ levels dropped sharply ($\approx$day 220) to levels below the accuracy of the tests used (<5 mg/L) and remained below 15 mg/L for the last 60 days of the experimental treatment.

Figure 10:
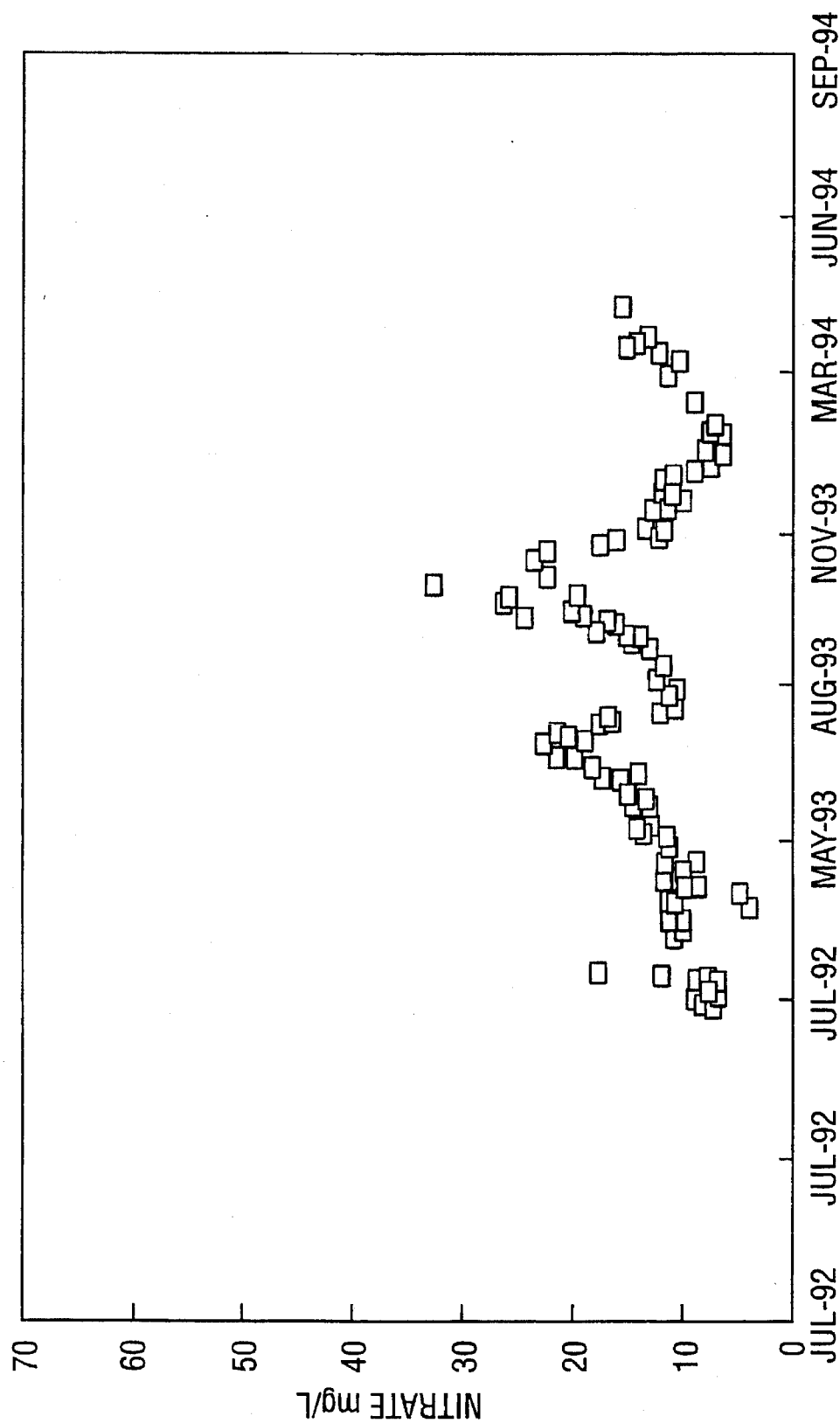

Since the end of this experiment, the bioreactor has operated continuously on-line for about 48 months, maintaining nitrate levels below 15 mg/L despite constant bioloading (see FIGS. 9 and 10).

BIBLIOGRAPHY

1. Balderston, et al., "Nitrate removal in closed-system aquaculture by columnar denitrification," *Appl. Env. Microbiology*, 32(6):808–818 (1976).
2. Becking, et al., "Limits of the natural environment in terms of pH and oxidation-reduction potentials," *J. of Geology*, 68(3):243–284 (1960).
3. Biswas, et al., "Nitrogen transformations and fate of other parameters in columnar denitrification," *Water Research*, 19(8):1065–1071 (1985).
4. Bokranz, et al., "Energy metabolism and biosynthesis of *Vibrio succinogenes* growing with nitrate or nitrite as terminal electron acceptor," *Arch Microbio*, 135:36–41, (1983).
5. Bonin, et al., "Denitrification by a marine bacterium, *Pseudomonas nautica* Strain 617," *Ann. Inst. Pasteur/Microbiol.*, 138:371–383 (1987).
6. Boyd, "Water quality in warmwater fish ponds," *Auburn Univ. Agric. Exp. Stn. Rep.*, (1984).
7. Boyd, et al., "Nitrogen fertilization of ponds. *Trans. Am. Fish. Soc.*," 107(5):737–741 (1978).
8. Brody, "Bioenergetics and growth, with special reference to the efficiency complex in domestic animals," Hafner Press (1974).
9. Culp, et al. (eds.), *Handbook of Advanced Wastewater Treatment* (2nd ed.), Van Nostrand Reinhold Co., New York (1987).
10. Esteves, et al., "Nitrate reduction activity in a continuous flow-through system in marine sediments," *Microb. Ecol.* 12:283–290 (1986).
11. Evans, et al., *Appl. Microbiol. Biotechnol.*, 37:136–140 (1992).
12. Heales, "Water quality changes during the conditioning of small, closed seawater systems," *CSIRO Marine Laboratories*, Report 176 (1985).
13. Krogulska, et al., "Bacterial microflora participating in the removal of nitrogen from industrial wastewaters by nitrification and denitrification," *Acta Microbiologica Plonica*, 33(1):67–76 (1984).
14. Lamb, et al., "Nitrogen removal for on-site sewage disposal: field evaluation of buried and filter/greywater systems," *Transactions of the ASAE* 34(3):883–889 (1991).
15. Lee, "Automation of aquaculture systems: a review and practical guide to implementation," Proc. Symposium on engineering aspects of intensive aquaculture, pp. 284–300, Northeast Regional Aquaculture Engineering Service, Ithaca, N.Y. (1991).
16. Lignel, et al., "Nitrogen metabolism in *Gracilaria secundata*," *Harv. Hydrobiologia*, 151/152:431–441 (1984).
17. Mycielski, et al., "Denitrification of high concentrations of nitrites and nitrates in synthetic medium with different sources of organic carbon. II. Ethanol," *Acta Microbiologica Polonica*, 32(4):381–88 (1983).
18. Przytocka-Jusiak, et al., "Intensive culture of Chlorella vulgaris/AA as the second stage of biologica purification of nitrogen industry wastewaters," *Water Research*, 18(1):1–7 (1984).
19. Ripley, et al., "Improved alkalimetric monitoring for anaerobic digestion of high-strength wastes," *J. Water Pollution Control Federation*, 58(5):406–407 (1986).
20. Spotte, *Seawater aquariums: the captive environment*, John Wiley and Sons, New York (1979).
21. Turk, et al., "Design and economic comparison of airlift versus electric pump driven recirculating systems," Proc. Symposium on engineering aspects of intensive aquaculture, Northeast Regional Aquaculture Engineering Service, Ithaca, N.Y., pages 271–283 (1991).
22. Tyler, et al., (eds.), *Fish energetics: new perspectives*, Johns Hopkins University Press (1985).
23. van Rijn, et al., "Aerobic and anaerobic biofiltration as an aquaculture unit-nitrite accumulation as a result of nitrification and denitrification," *Aquacultural Engineering*, 9:217–234 (1990).
24. Wilson, "An experimental search for phytoplanktonic algae producing external metabolites which condition natural sea waters," *Marine Biological Association of Great Britain*, 61:585–607 (1981).
25. Yang, et al., "Design and function of closed seawater systems for culturing Loliginid squids," *Aquacultural Engineering*, 8:47–65 (1989).
26. Adams, "Anatomy of an automation project," *Programmable Controls*, 8(4):39–41 (1989).
27. Dahab, et al., "Nitrite removal from water supplies using biological denitrification," *Journal of the Water Pollution Control Federation*, 60:1670–1674 (1990).
28. Fanin, et al, "Anaerobic processes," *Journal of the Water Pollution Control Federation*, 58:504–510 (1986).

29. Fanin, et al, "Anaerobic processes," *Journal of the Water Pollution Control Federation,* 59:403–409 (1987).

30. Gary, "On-line electrochemical sensors in fermentation,"*American Biotechnology Laboratory,* 7(2):26–33 (1989).

31. Hughs, et al., "A pilot-scale reuse system for salmonids," *Progressive Fish-Culturist,* 47:251–253 (1985).

32. Jones, "Denitrification by anaerobic filters and ponds—Phase II. Bio-Engineering Aspect of Agricultural Drainage, San Joaquin Valley, Calif.," Water Pollution Control Research Series, Report No. #13030 ELY 06/71-14, (1971).

33. Kruner, et al., "Nitrogen removal by biological denitrification in a recirculated fish culture system," International Council of the Exploration of the Seas, F:21/CM (1984).

34. Lee, "Computer automation for recirculating systems," *Techniques for Modern Aquaculture,* pp. 61–70, American Society of Agricultural Engineers, St. Joseph, Mich. (1993).

35. Otte, et al., "Management of a closed brackish water system for high-density fish culture by biological and chemical water treatment," *Aquaculture,* 18:169–181 (1979).

36. Payne, "Reduction of nitrogenous oxides by microorganisms," *Bacteriological Reviews,* Dec 1973:409–452 (1973).

37. Poston, et al., "Interrelations of oxygen concentration, fish density, and performance of Atlantic Salmon in an ozonated water reuse system," *The Progressive Fish-Culturist,* 50:69–76 (1988).

38. Whitson, et al., "Biological denitrification in a closed recirculating marine culture system," *Techniques for Modern Aquaculture,* pp. 458–66, American society of Agricultural Engineers, St. Joseph, Mich. (1993).

39. William, et al., "Smart data acquisition: coupling microcontroller and sensor," *Scientific Computing and Automation,* 4(2):59–62 (1989).

40. Yingst, "PC-based architecture guide process control," *In Tech,* 35(9):117–120 (1988).

While this invention has been described by reference to specific illustrative embodiments thereof, many changes and modifications of the invention may become apparent to those skilled in the art without departing from the spirit and scope of the invention.

What is claimed is:

1. A process for the reduction of nitrate to nitrogen in a fluid medium, comprising the steps of:

providing an anaerobic or partially anaerobic fluid medium containing nitrate and having a variable oxidation-reduction potential;

exposing the fluid medium to anaerobic bacteria for a process residence time;

adding a fluid-miscible carbon source to the fluid medium whereby the anaerobic bacteria reduces at least some of the nitrate to nitrogen;

measuring an oxidation-reduction potential in the fluid medium downstream from the anaerobic bacteria; and controlling the addition rate of the carbon source to the fluid medium and controlling the process residence time using the measured oxidation-reduction potential to achieve a desired level of reduction of the nitrate to nitrogen.

2. The process of claim 1, wherein the fluid medium has an oxygen content of less than about 1.5 mg/liter.

3. The process of claim 1, wherein the fluid medium has an oxygen content of less than about 1.2 mg/liter.

4. The process of claim 1, wherein the fluid-miscible carbon source comprises methanol.

5. The process of claim 1, wherein the nitrate is reduced to a level below about 10 mg/liter.

6. The process of claim 1, wherein the addition rate of the carbon source and the process residence time are controlled automatically.

7. The process of claim 1, wherein the addition rate of the carbon source and the process residence time are controlled using fuzzy logic.

8. The process of claim 1, wherein the carbon source is added to the fluid medium whereby the carbon from the carbon source and the nitrogen from the nitrate have an atomic ratio (C:N) from about 1:1 to about 6:1.

9. The process of claim 1, wherein the carbon source is added to the fluid medium whereby the carbon from the carbon source and the nitrogen from the nitrate have an atomic ratio C:N from about 1:1 to about 3:1.

10. The process of claim 1, wherein the anaerobic fluid medium is provided by providing a fluid medium containing oxygen and displacing the oxygen with a gas.

11. The process of claim 10, wherein the gas is biologically neutral.

12. The process of claim 10, wherein the gas comprises nitrogen.

13. The process of claim 10, wherein the gas is injected into the fluid medium in a countercurrent direction from the fluid medium.

14. The process of claim 10, wherein the gas is added to the fluid medium at a variable rate determined by the oxygen content of the fluid medium.

15. The process of claim 14, wherein the addition rate of the gas is controlled automatically.

16. A process for the reduction of nitrate to nitrogen in an aqueous stream, comprising the steps of:

providing an anaerobic or partially anaerobic aqueous stream containing nitrate and sulfate and having a variable oxidation-reduction potential;

exposing the aqueous stream to anaerobic bacteria for a process residence time;

adding a water-miscible carbon source to the aqueous stream whereby the anaerobic bacteria reduces at least some of the nitrate to nitrogen but does not substantially reduce the sulfate to hydrogen sulfide;

measuring an oxidation-reduction potential in the aqueous stream downstream from the anaerobic bacteria; and controlling the addition rate of the carbon source to the aqueous stream and controlling the process residence time using the measured oxidation-reduction potential to achieve a desired level of reduction of the nitrate to nitrogen.

17. The process of claim 16, wherein the aqueous stream comprises water from an aquarium or an aquaculture system.

18. The process of claim 16, wherein the aqueous stream comprises water supporting aquatic life.

19. The process of claim 16, further comprising the step of aerating the aqueous stream downstream from the anaerobic bacteria whereby the aqueous stream is capable of supporting aquatic life.

20. A system for the reduction of nitrate to nitrogen in an anaerobic or partially anaerobic fluid medium comprising:

means for exposing the fluid medium to anaerobic bacteria for a process residence time;

means for adding a fluid-miscible carbon source to the fluid medium to induce the anaerobic bacteria to reduce the nitrate to nitrogen;

means for measuring oxidation-reduction potential in the fluid medium downstream from the exposing means; and means for controlling the addition rate of the carbon source to the fluid medium and for controlling the process residence time using the measured oxidation-reduction potential to achieve a desired level of reduction of the nitrate to nitrogen.

21. The system of claim 20, wherein the exposing means comprises a bacterial bed comprising a plurality of beads and means for suspending the beads.

22. The system of claim 20, wherein the control means are automated.

23. The system of claim 22, wherein the automated control means comprise means for acquiring and concentrating data and a central processor.

24. The system of claim 23, wherein the central processor comprises a computer.

25. The system of claim 23, wherein the means for acquiring data comprise at least one electrical sensor.

26. The system of claim 23, wherein the means for acquiring data comprise at least one mechanical sensor.

27. The system of claim 20, further comprising means for displacing oxygen in the fluid medium with a gas to make the fluid medium anaerobic or partially anaerobic.

28. The system of claim 27, wherein the displacing means comprise a countercurrent gas injector.

29. The system of claim 27, further comprising means for controlling the addition rate of the gas to the fluid medium.

30. The system of claim 29, wherein the control means are automated.

* * * * *